April 18, 1933.   W. A. ADAMS   1,904,708
WORKBENCH
Filed April 15, 1931   7 Sheets-Sheet 1

INVENTOR
Walter A. Adams
BY
*His* ATTORNEY

April 18, 1933.   W. A. ADAMS   1,904,708
WORKBENCH
Filed April 15, 1931   7 Sheets-Sheet 2

April 18, 1933.  W. A. ADAMS  1,904,708

WORKBENCH

Filed April 15, 1931   7 Sheets-Sheet 4

INVENTOR
Walter A. Adams
BY
his ATTORNEY

April 18, 1933. W. A. ADAMS 1,904,708
WORKBENCH
Filed April 15, 1931 7 Sheets-Sheet 5

INVENTOR
Walter A. Adams
BY
his ATTORNEY

April 18, 1933.                W. A. ADAMS                1,904,708
                                 WORKBENCH
                    Filed April 15, 1931        7 Sheets-Sheet 6

INVENTOR
Walter A. Adams
BY
*H. W. Simms*
his ATTORNEY

Patented Apr. 18, 1933

1,904,708

UNITED STATES PATENT OFFICE

WALTER A. ADAMS, OF ROCHESTER, NEW YORK

WORKBENCH

Application filed April 15, 1931. Serial No. 530,240.

The present invention relates to work benches and an object of the invention is to improve work benches in such a manner that each operative will be situated in the most effective position to an endless delivery conveyor while having a storage place provided in an effective position for work to be operated upon. Another object of the invention is to provide in connection with a plurality of work tables arranged in parallel relation, a conveyor table from which said parallel tables extend laterally provided with storage space below the conveying surface and adjacent those ends of the work tables adjacent the conveyor table. Still another object of the invention is to provide a delivery or conveyor table with a storage space between the laps of an endless delivery conveyor. A further object of the invention is to provide a work table which is so constructed that it provides a storage space at one side. A still further object is to provide a construction that will permit work tables to be spaced as may be desired with relation to delivery tables without materially changing the size or availability of storage space provided by the combination of work table and delivery table. Another and still further object of the invention is to provide a work table arranged so that it will keep aisles clear of work and operatives during the working process. It is further designed to provide a work table or bench comprising a framework including transversely extending frames each having a recess in one or both sides thereof with a conveyor belt having a lap guided on the upper portion of the framework above the recesses of said frames, so as to provide for unobstructed access to a work support arranged in said framework below the upper lap of the conveyor at and between the transverse frames substantially throughout the length of the work table or bench.

It is a further object to provide a work table or bench including a top with a work support mounted under and spaced from the top of the table or bench and a work container movably secured with relation to the work support to increase the supporting capacity of the work support and which is shiftable when not in use to a position between the top of the work bench and the work support without disconnecting the container from its securing means.

To these and other ends, the invention consists of certain parts and combinations of parts all of which will be hereinafter described: the novel features being pointed out in the appended claims.

In the embodiment of the invention illustrated in Figs. 1 to 16 inclusive, there is employed a work delivery table comprising an endless conveyor or belt 1 passed about a pulley 2 at the intake of the table and about a pulley 3 at the discharge end of the table. The two pulleys are each supported by a shaft 4 journalled on bearing blocks 5 which are supported on a frame 6, there being two of such frames arranged at opposite ends of the delivery table.

The upper lap of the carrier or conveyor travels over and in close proximity to a flat bed 7 which acts to prevent the sagging or flexing of the carrier under the weight of the articles thereon.

This bed is supported at intervals by transverse frames. In this embodiment, two forms of these frames are provided, the intermediate frames and the end frames. Each of the intermediate frames (see Fig. 10) embodies two short uprights each formed of two angle iron pieces each having one of its flanges 8 parallel with and spaced from a like flange on the other and the flange 9 in a plane with a like flange on the other angle iron piece and at the inner side of the upright. A cast foot piece 10 connects the lower ends of these two pieces. The short uprights on the two sides of each of these transversely extending frames are connected at their upper ends by a transverse horizontal support, in this instance, two angle iron pieces. Each of such pieces has a flange 11 vertically arranged and secured to the outer faces of the flanges 8 on two of the short uprights. The other flange 12 of each angle iron piece extends outwardly and in a horizontal plane with a like flange 12 on the other angle iron piece. On the flanges 12 of each of such transverse frames are supported boards 13 providing a shelf or work rest.

Figure 10:
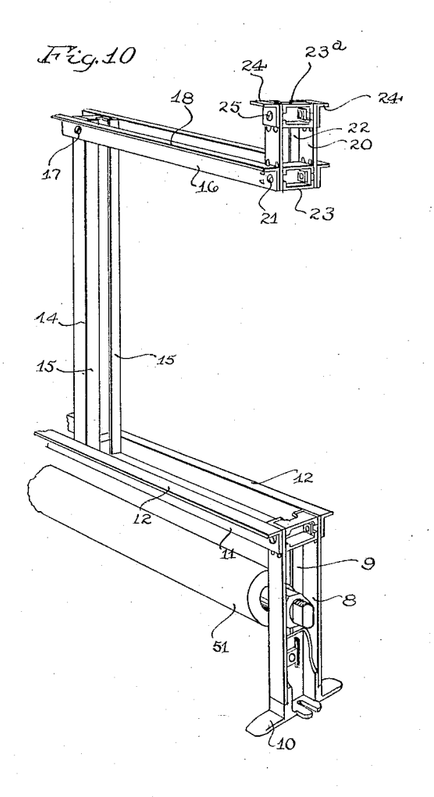
Fig. 10 is a perspective view of one-half of one of the transverse frames for the delivery table.
Figure 11:
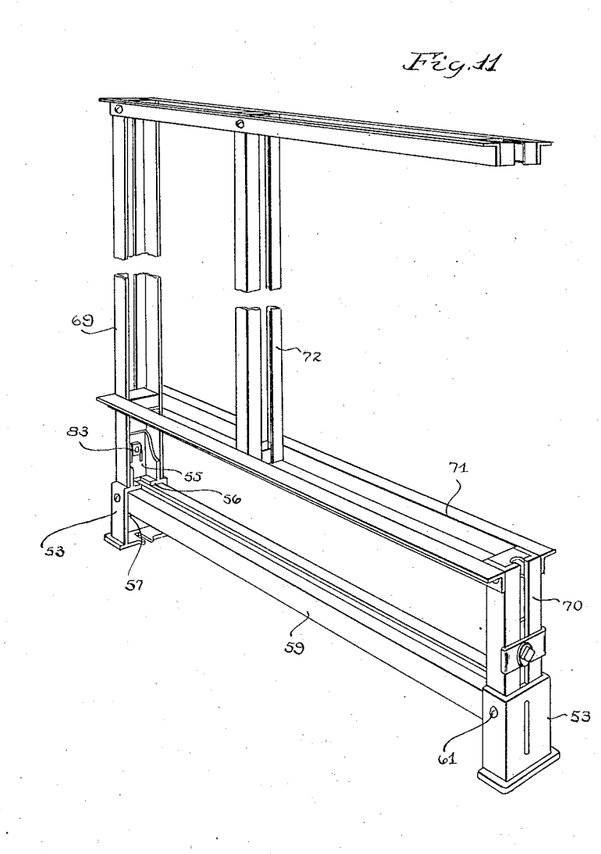
Fig. 11 is a perspective view of the inner side frame of one of the work tables.
Figures 12, 14:
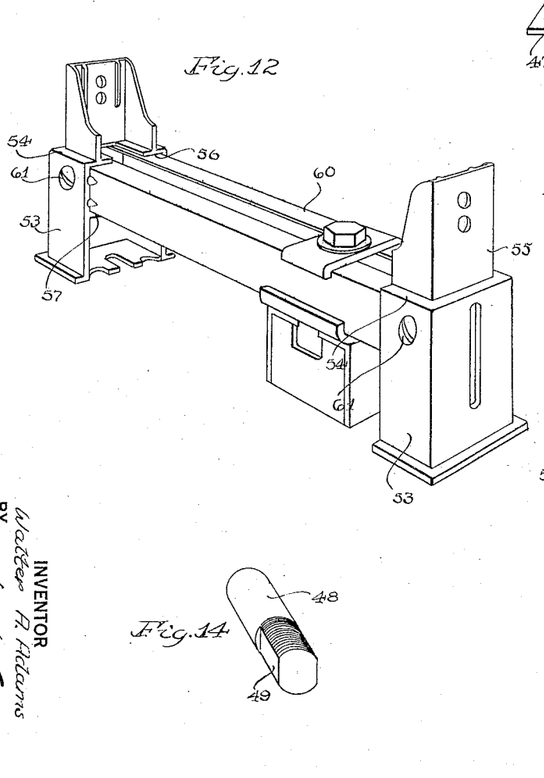
Fig. 12 is a perspective view of the lower portion of each of the side frames of the work tables.
Fig. 14 is a fragmentary perspective view of an end of one of the roller supporting shafts.
Figure 13:
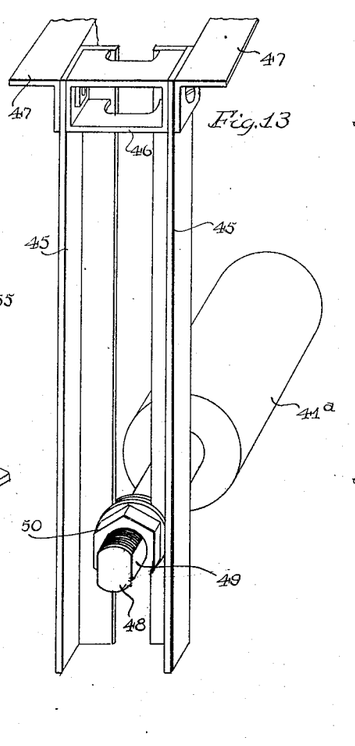
Fig. 13 is a fragmentary perspective view of the short roller supporting frame adjacent the discharge end of the machine.
Figure 15:
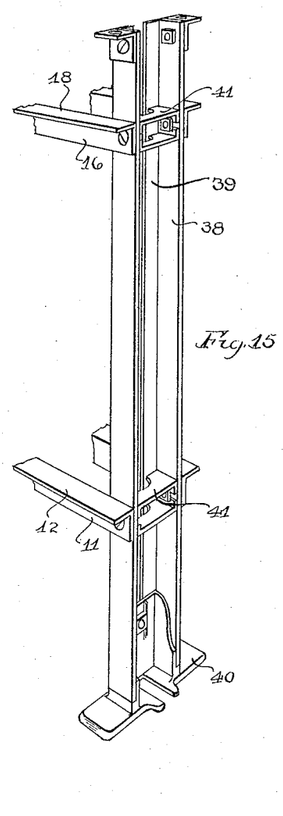
Fig. 15 is a fragmentary perspective view of one side of one of the transversely extending frames of the delivery table.

To the inner or opposed faces of the flanges 11 near the center of the latter are bolted four angle iron pieces arranged in two pairs and forming a vertical supporting means in spaced relation to opposite sides of the transverse frame and the endless carrier for supporting the bed 7 above the shelf boards 13. Each of these four angle irons, in this instance, has a flange 14 parallel with a like flange 14 on another of the angle irons and projecting inwardly from the flange 15 thereof, said flange 15 lying on the outer side of each pair of flanges 14 and being in a vertical plane with the like flange 15 of the other pair.

The vertical supporting means formed by these four angle iron pieces has at its upper end a horizontal supporting means for the bed 7. This horizontal supporting means embodies, in this instance, two angle iron pieces each having a vertical flange 16 parallel with and spaced from a like flange 16 on the other piece and bolted at 17 to the outer faces of the flanges 14 of one of the angle iron pieces of each pair of the four vertical ones. The other flange 18 of each horizontal angle iron piece extends outwardly and in a horizontal plane with a like flange 18 of the other angle iron piece of the two horizontal ones. To these horizontal flanges 18 the bed 7 is bolted.

It is preferred to provide retaining walls 19 at opposite sides of the delivery carrier. In this instance, at the ends of the horizontal bed supporting means two short supports are projected upwardly. Each of these short supports embodies two angle iron pieces each having a flange 20 extending toward the adjacent side of the frame and parallel with a like flange on the other angle iron piece, this flange being bolted at 21 to the inner face of the flange 16. The other flange 22 of each of such short angle iron pieces is parallel with a like flange on the adjacent angle iron piece and has a retaining wall 19 bolted thereto. A tie piece 23 is held by the bolts 21 between the lower ends of the short angle iron pieces and the adjacent ends of the two upper horizontal angle iron pieces. The upper ends of the retaining-wall-supporting angle iron pieces are tied together by tie pieces 23ª and provided with short angle iron brackets 24 which are bolted to the flanges 20 at 25 and have a ledge 26 bolted thereto, the ledge extending outwardly from the retaining wall.

The end or first two and the last two transversely extending supporting frames (see Fig. 15) are formed differently from the intermediate transversely extending supporting frames. Each of these frames embodies two uprights at opposite sides of the frame, each upright consisting of two angle iron pieces each arranged with a flange 38 parallel with a like flange on the other piece and projecting toward the outer side of the frame. The other flange 39 of each angle iron piece projects toward and in a vertical plane with a like flange on the other angle iron piece. A foot piece 40 connects the lower ends of the angle iron pieces of each upright and tie pieces 41 connect the angle iron pieces at different points in their lengths to hold the flanges 38 in spaced relation. Angle iron pieces connect the two uprights of the second and next to last transverse frames to form supports for the shelf boards 13 which terminate at these two frames. The connecting angle iron pieces for these two frames have vertical flanges 11 bolted to the outer faces of the flanges 38 and horizontal flanges 12 projecting outwardly from the upper edges of the flanges 11 and having the boards 13 bolted thereto. Spaced from the upper ends of the side uprights of the end or last two frames at the delivery end of the machine, and also the second frame at the intake end of the frame are two angle iron pieces to which the bed 7 is secured. These angle iron pieces have vertical flanges 16 bolted to the flanges 38 and horizontal flanges 18 projecting outwardly in the same plane from the upper edges of the flanges 16 and serving to support the bed 7. The first transversely extending supporting frame is substantially the same as the second.

The lower parts of the intermediate transversely extending supporting frames as well as the second and last two end frames are connected, in this instance, by two side or connecting bars, each, in this instance, comprising two angle iron pieces each having a flange 27 parallel with a like flange on the other angle iron piece and a flange 28 in a plane with and extending toward a like flange on the other angle iron piece of the pair. Tie pieces 29 are bolted in position between the flanges 28, and make a unitary structure of each side or connecting bar. In this instance, each connecting bar is held in position by bolts 30 each passed through the longitudinal opening 32 formed between the two angle iron pieces, and through the slot in an upright of the transversely extending frame, its ends being held by anchoring devices 33 which engage both the front and the rear of the flanges of the two angle iron pieces forming an upright and also with the flanges 28 of connecting pieces. Between the connecting bar and the upright is arranged a plate 34 through which the bolt 30 passes. This plate has two flanges 35 projected from opposite edges on one side to engage the side bar and two flanges 36 at right angles to the flanges 35 projected from opposite edges on the other side to engage opposite sides of the short uprights. In this way a proper positioning of the bar on the uprights is obtained. It is apparent that this connection between the side bar and the transversely extending frames, permits the bars to be arranged at any desired height, and the transversely extending frames and work tables to be positioned at any points in the length of a bar.

The bed 7 at the receiving end of the table projects in slight advance of the first transversely extending supporting frame, whereas, the ledges 26 and the retaining walls 19 are projected still further in advance of the bed 7. Those portions of the retaining walls in advance of the bed are connected by a platform 37 which has its edge adjacent the bed 7 spaced from the latter for the passage of the belt 1 from the front pulley 2. The articles to be delivered by the belt or carrier 1 are first placed on the platform and then placed on the belt or carrier 1 to be carried along the table and if not removed delivered at the delivery end of the table. At the delivery end, the second roller 3 is arranged so that the belt 1 passes over its periphery after passing beyond the end of the bed 7. Connecting devices may connect the pulley supporting frame 6 with the last transversely extending frame and may comprise angled pieces 40$^a$ bolted to an upright on each side of the frame 6 and to the uprights of the adjacent transversely extending frame.

After the belt or carrier 1 passes from the roller 3 it travels above a roller 41$^a$ supported beneath the belt 1 between the last two transversely extending frames. In this instance, a supporting structure for said roller is provided comprising two side or connecting bars 42 formed of angle iron pieces like the side or connecting bars shown in Figs. 8 and 9 and secured to the two sides of the uprights of the last two transversely extending frames by clamping means 43. To each of these two side bars 42 is secured, by a clamping device 44, an upright 45 (see Fig. 13) formed of two angle iron pieces which project above and below the side bars 42 and are connected by tie pieces 46. These uprights are connected at their upper ends by horizontal connecting means formed of two angle iron pieces 47 which are bolted to the under side of the bed 7.

The shaft 48 of the roller 41$^a$ has its opposite ends flattened on opposite sides at 49 and passed through the slots of the two uprights 45 in those portions depending below the side bars 42. This reduced portion is screw threaded and has a nut and two washers 50 thereon on the outside of the upright to hold the shaft to the uprights against turning. The nut and washer are housed in the space between the outwardly projecting flanges on the upright.

From the roller 41$^a$ the belt 1 passes beneath a roller 51 which likewise turns on a shaft 52 mounted on the uprights of the next to last transversely extending frame and secured in said uprights in the same manner as the shaft 48. The belt 1 now travels above rollers 51$^a$ which are secured to shaft 52$^a$ held to the short uprights of the intermediate transversely extending frames. The belt continues to travel over the rollers 51$^a$ until the roller 51$^b$ of the transverse frame immediately in front of the pulley supporting frame 6 of the pulley 2 is reached when the belt passes beneath the roller 51b of such frame and thence upwardly about the pulley 2.

Associated with the delivery table are a plurality of work benches. Each of these benches, in this instance, embodies four feet 53 (see Figs. 11 and 12) formed from castings and each having an intermediate external upwardly presented shoulder or abutment 54 on three sides. Each casting is reduced at 55 both internally and externally above the shoulder and has one vertical side wall open. Each casting or foot has below the external shoulder 54, internal shoulders 56 on opposite side walls and spaced beneath these shoulders 56 shoulders 57 on opposite side walls. Between the shoulders on each of said side walls is a bolt opening 58. To connect two feet at one end of the bench or table two parallel angle irons are provided. Each angle iron has a vertical flange 59 abutting the inner face of one wall of a foot and its lower edge abutting the shoulder 57. The horizontal flange 60 of each angle iron extends inwardly in a plane with but spaced from the flange of the other angle iron and in abutment with the internal shoulder or abutment 56. Bolts 61 passing through the angle irons and the openings 58 secure the angle irons to the feet. It will thus be seen that the feet at each side of the bench are connected together by a horizontal connecting means which is provided with a longitudinally extending slot or guide through which other means may be readily connected to the feet. At the same time each foot has a portion 55 projecting upwardly therefrom and serving as a means for attaching the feet to suitable uprights.

The side frame at the right hand side of each table comprises, in this instance, two uprights of equal length. Each upright, in this instance, embodies two angle iron pieces secured to the reduced extensions 55 and arranged with their flanges 62 parallel and their flanges 63 lying in the same plane and extending toward each other but spaced apart at 64. The upper ends of each pair of these angle iron pieces are connected by spacing devices 65 and the two uprights are connected by horizontal connecting means embodying two angle iron pieces each having a vertical flange 66 secured by a bolt 67 to the outer face of an angle iron of each pair, and a horizontal flange 68 lying in a horizontal plane with a like flange on the other horizontal angle iron of the pair and extending outwardly and having the top 68a secured thereto.

The side frame at the other end of the table has a forwardly opening recess below its top and above its feet. In this embodiment instead of two uprights of equal length one upright 69 of the same length and formed in the same manner as those on the right hand side of the table is provided while the other upright 70 is shorter and comprises two angle iron pieces arranged in the same manner as the longer uprights to provide a vertical slot. The upper end of the short upright is connected with the long upright by horizontal connecting means, in this instance, in the form of two angle irons 71 spaced apart and having vertical flanges secured to the outer faces of the long and the short uprights 69 and 70, the other flanges of the angle iron pieces being in the same plane and extending outwardly. A third upright 72 with a vertical slot extends from an intermediate portion of the horizontal connecting means 71 upwardly and comprises two angle iron pieces with spaces 72a between their ends bolted at 73 to the inner faces of the angle iron pieces forming the horizontal connecting means 71. To the upper ends of the uprights 69 and 72, a horizontal table top support 75 is bolted at 74, the horizontal table support comprising, in this instance, two angle iron pieces 75 with vertical flanges arranged on the outer faces of the uprights 69 and 72 with vertical flanges parallel and horizontal flanges in the same plane and extending outwardly.

The two uprights of each side frame of each work table are connected to the two feet by bolts 80 each of which passes through a clamping plate 81, thence through the slot of an upright and through an opening 82 in the reduced extension 55, a nut 83 holding the bolt in position.

Figure 1:
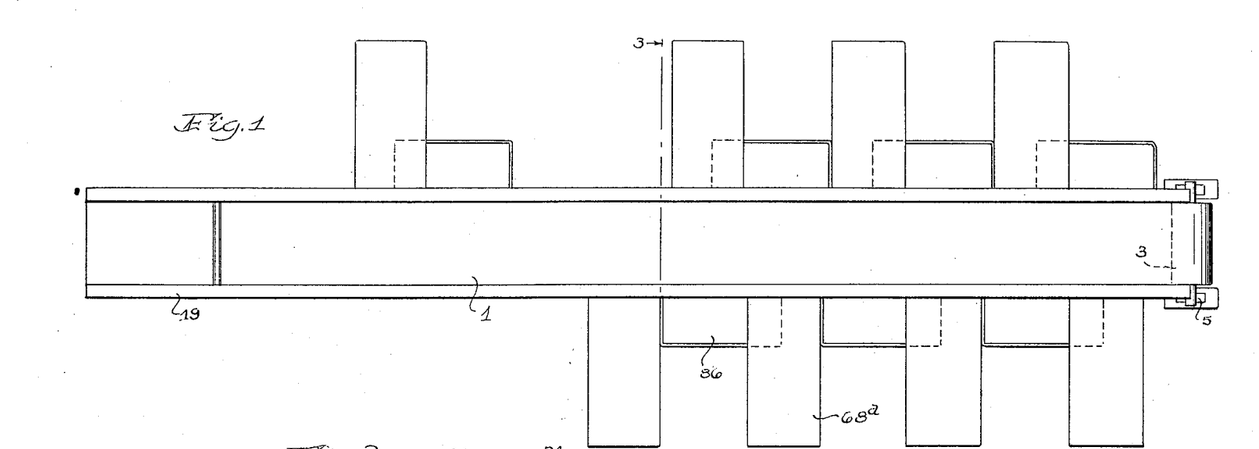
Fig. 1 is a plan view of one embodiment of the invention.
Figure 2:
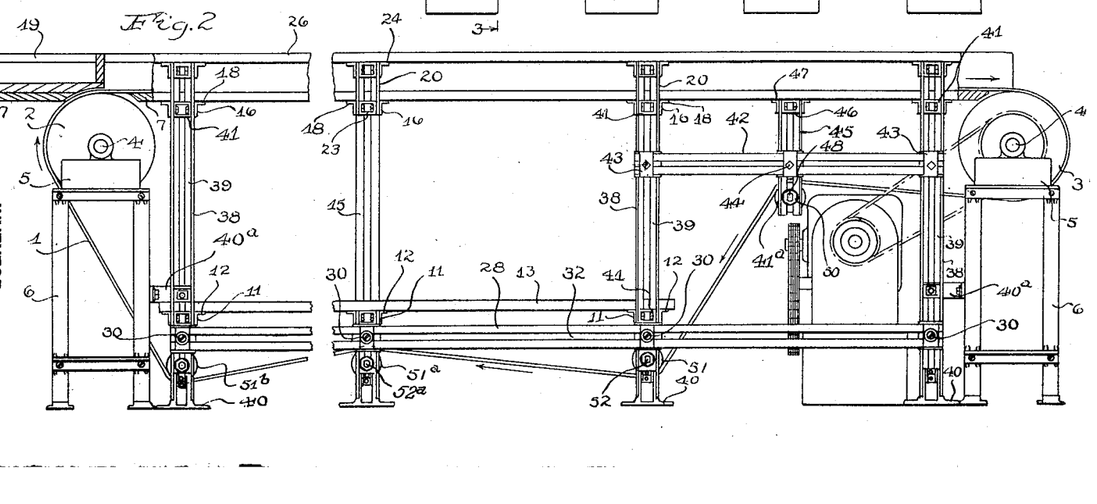
Fig. 2 is a fragmentary side view of the embodiment shown in Fig. 1 enlarged.
Figure 3:
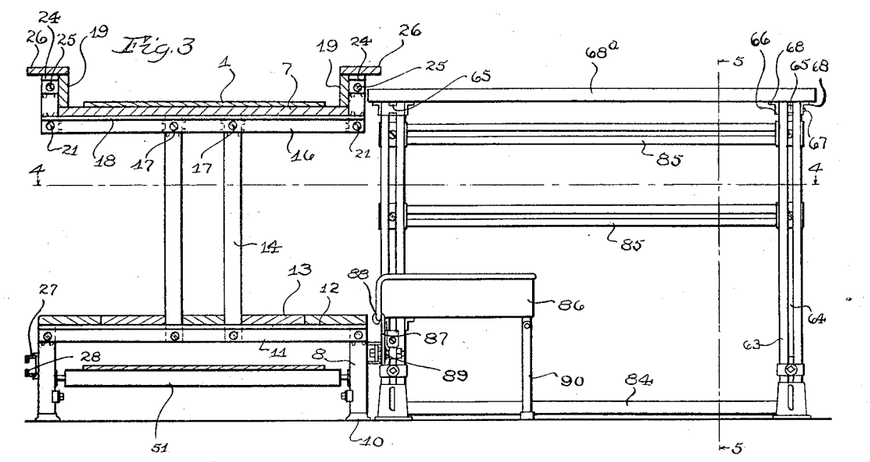
Fig. 3 is an enlarged section on the line 3—3, Fig. 1.
Figure 4:
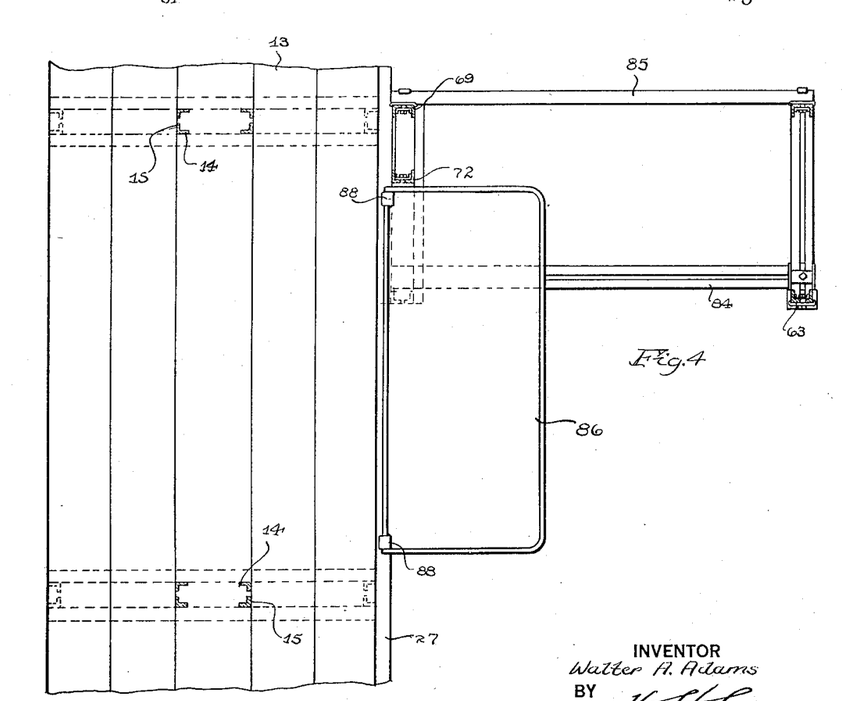
Fig. 4 is a horizontal section on the line 4—4, Fig. 3.
Figure 5:
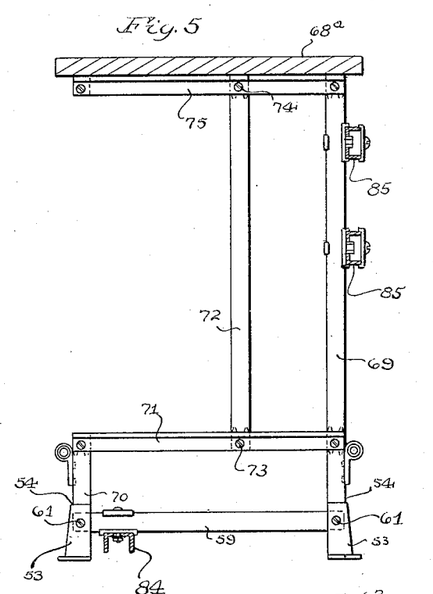
Fig. 5 is a section on the line 5—5, Fig. 3.
Figures 6, 16:
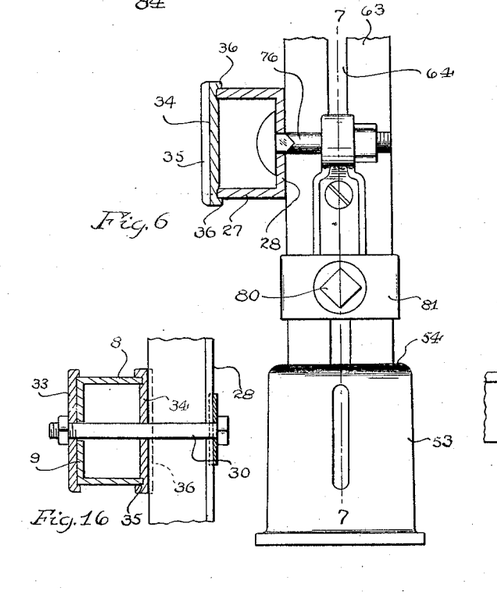
Fig. 6 is a detail view of the connection between the support for the endless carrier and a lateral work table.
Fig. 16 is a sectional detail view of the means for connecting the side bar units to the bench.
Figure 7:
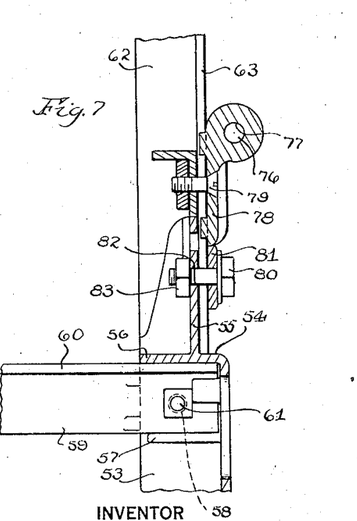
Fig. 7 is a fragmentary sectional view on the line 7—7, Fig. 6.
Figure 8:
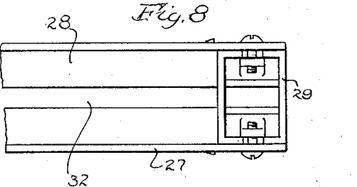
Fig. 8 is a detail view of one end of one of the side bar units.
Figure 9:
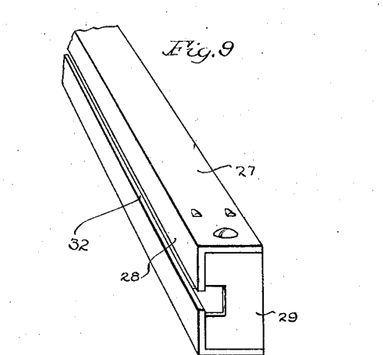
Fig. 9 is a perspective view of one of the side bar units.

The angle irons 59 and 60 of the two frames at opposite ends of each work table are connected by a connecting bar or rail 84 formed like that shown in Figs. 8 and 9 and are adapted to support a treadle for controlling any machine on the table. Rails 85 connect each angle iron upright 69 on the inner end frame of each table with the angle irons 63 and 62 at the rear of the outer end frame and can serve to support a motor for driving a machine on the work table.

The work tables are adjustably connected to the work delivery table so as to be positioned at any point along the length of said delivery table. In this instance, the connecting bars 27—28 are employed as part of the connecting means. Through the slot between the flanges 28 are projected two bolts 76 which also pass through two eyes 77 in brackets 78. The latter are held in place by bolts 79 passing into the slot of the adjacent upright. In this way one side of each work table is removably secured to a side of the delivery table and may through the slot in the connecting bar be shifted to any point along the delivery table.

With the end in view of providing a large storage space for the operatives at the work tables, each table has arranged in the recess of its inner side frame a basket platform or container 86 which has its bottom substantially in the horizontal plane of the shelf or work support 13 and opens laterally or at the side adjacent the shelf 13 so as to form a continuation of the latter. The container also projects in front of the work table as well as beyond table 7 so that the goods or work may be in a handy position with reference to an operative at work at the table and to conveniently receive work from the conveyor belt above. The basket platform or container is arranged above the supporting portion 71 of the side frame and is hingedly supported from the bar 28 by straps 87, being hinged at 88 from the inner open side, so that the basket may be arranged at any point through length of common table, the straps being secured to the bar 28 by clamps 89. A leg 90 depends from the basket near its outer side. The basket through the hinge may be swung upwardly and onto the shelf 13 when its use is not desired or to facilitate sweeping.

It will be seen that in this form of the invention, the work is delivered by a belt to any one or number of operatives working at the tables extending laterally from the delivery table. The operatives take up the work designed for them and place it into these baskets until ready to operate on the same. The baskets or containers are extended under the tables of the operatives and also open throughout their lengths to a work supporting shelf or platform arranged between the laps of the endless conveyor belt of the work delivering table. After the operatives finish operating on their work the latter is put back onto the delivery table for delivery to another operative or at the end of the delivery table.

Figure 17:
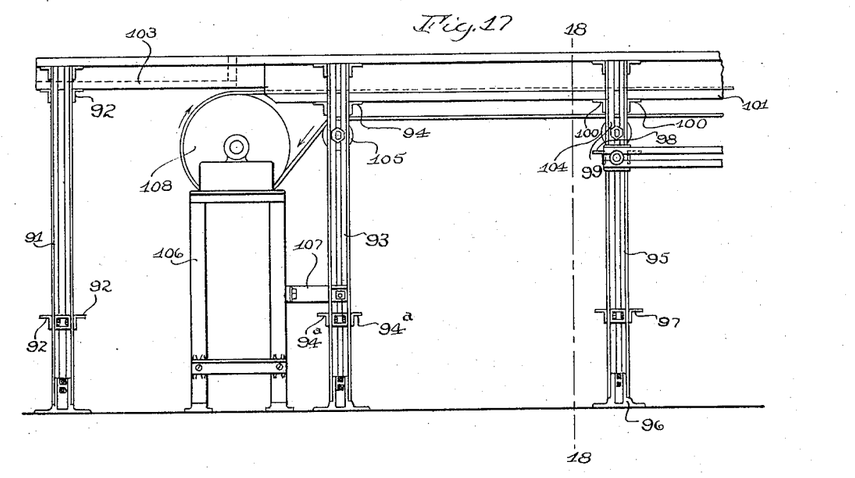
Fig. 17 is a side view of the receiving end of another embodiment of the bench.
Figure 18:
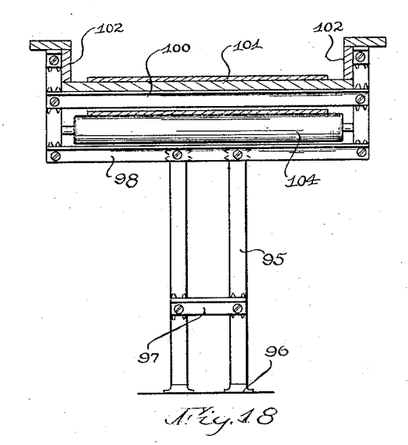
Fig. 18 is a section on the line 18—18, Fig. 17.
Figure 19:
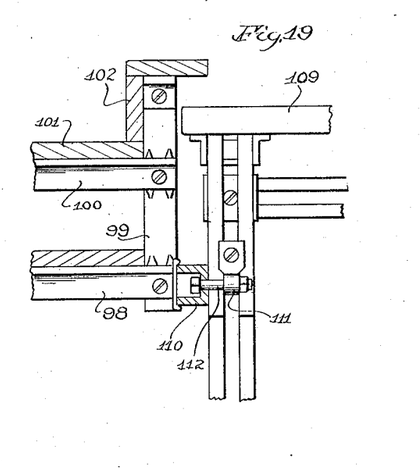
Fig. 19 is a fragmentary view showing the manner in which the work tables connect with the delivery tables.

In the embodiment of the invention shown in Figs. 17 to 19 inclusive, the receiving end of a delivery table is shown. The first transverse frame is formed of uprights 91 connected by two cross connections 92 and each formed of two angle iron pieces. The second frame comprises similar uprights 93 connected by two cross connections 94ᵃ formed of angle iron pieces. The third transverse frame and those thereafter except the last two at the delivery end of the delivery table comprise each two parallel uprights 95 (see Fig. 18) having feet 96 at their lower ends and connected together by angle iron connecting pieces 97. The upper ends of these uprights 95 are connected by two angle iron pieces 98 which project beyond the sides of the central support formed by the uprights 95. From the outer ends of the cross angle iron pieces 98, angle iron pieces 99 project upward, in parallel relation and in pairs. The pairs of uprights at opposite ends of the cross pieces 98 are connected by angle iron pieces 100 which act as supports for a table 101 which also extends to and is supported by the cross piece 94 of the second and next to last transverse frame. Side boards 102 are secured above the table 101 to the inner faces of the uprights 99. These side boards extend to the first frame and are secured to the inner faces of the uprights 91 above the upper cross connection 92 which is in a higher plane than the upper cross connections 94 and 100 and support the receiving end of the delivery table 103 in a slightly higher plane than the table 101 and in spaced relation to the end of the latter.

Beneath the cross connections 100 rollers 104 are mounted to rotate on the uprights 99. A roller 105 is mounted to rotate on the uprights 93 below the upper cross connections 94 on the second frame. Between the first and second frames is arranged a frame or stand 106 which is by connection 107 secured to the uprights of the second frame. This frame 106 supports a drum 108 for an endless feeding belt or conveyor, the upper lap of which enters the slot between the table 101 and the adjacent edge of the receiving table 103 and passes over the table 101 to the end of the machine, returning over rollers 104 to roller 105 and thence to roller 108. It is apparent that the length of the belt and the bench may be made to correspond to the needs of the user.

The work tables 109 may be the same construction as the other embodiment of the invention, and in order that they may be secured to the delivery table, those frames of the delivery table like that shown in Fig. 18 are connected at opposite sides by a member 110 formed by two connected angle iron pieces like those shown in Fig. 9, which are fastened to the uprights 99 on the transverse frames of the delivery table. Connection between the work tables and the delivery table is made by providing the two upright frames of the work tables with eyes 111 through each of which a bolt 112, which is anchored in the longitudinally extending member 110, may pass. The slot in the member 110 extends longitudinally of the delivery table and permits the laterally extending work tables to be positioned at any points along the length of the delivery table. The sides of the transverse frames of the delivery table permit the floor under the delivery table to be used as a storage space at any point throughout its length without obstruction.

Figures 20, 21, 22:
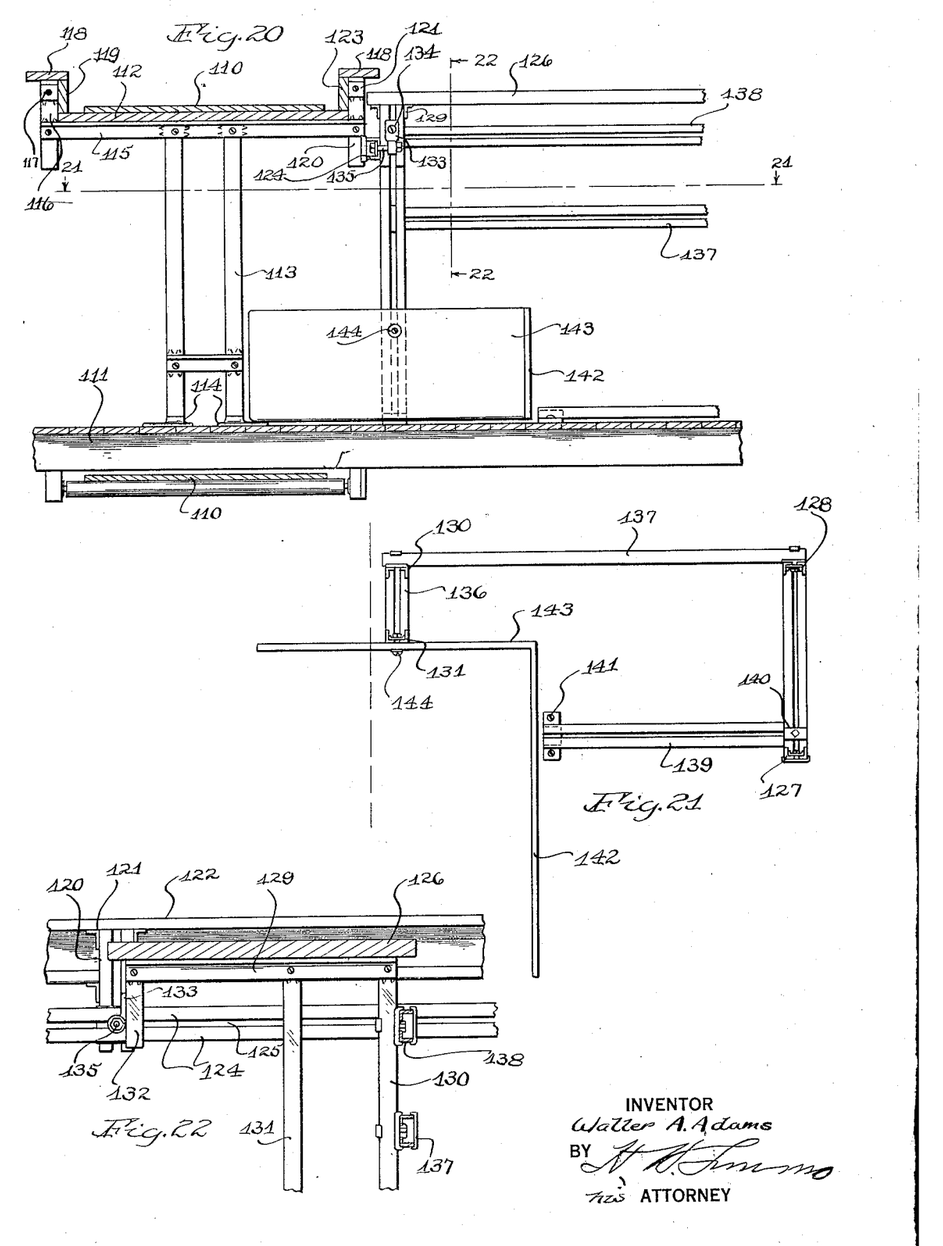
Fig. 20 is a vertical fragmentary section through another embodiment of this invention.
Fig. 21 is a section on the line 21—21, Fig. 20.
Fig. 22 is a section on the line 22—22, Fig. 20.

In the embodiment shown in Figs. 20 to 22 inclusive, the endless belt or conveyor 110 is guided so that its upper lap travels above a flooring 111 while the lower lap travels beneath the flooring. The intermediate portions of the upper lap travel over a table 112 supported by transverse frames each of which comprises two opposed parallel uprights 113 secured by floor plates 114 at their lower ends and having their upper ends secured to intermediate portions of two angle irons 115 to which the table 112 is secured. Two short parallel pieces 116 extend above and below one end of the pieces 115 and have angle iron pieces 117 secured thereto and serving to support a ledge board 118. A side board 119 extends upwardly from the table to the ledge board 118. On the other side of the conveyor table, two spaced parallel angle iron pieces 120 extend above and below the angle iron pieces 112 and have angle iron pieces 121 at their upper ends secured to an edge board 118. A side board 119 extends upwardly from the table 112 to the ledge board 118. Those portions of the angle iron pieces 120 extending below the cross or connecting pieces 115 serve to support two angle iron pieces 124 which are arranged in spaced parallel relation to form a slot 125 between pieces 124. These provide a means through which the anchoring of the work tables to the delivery or conveyor table is effected, as will be hereinafter pointed out. It will be noted that the floor beneath the upper lap of the table is unobstructed except for the uprights 113 and their floor plates so that the floor provides a storage space between the upper lap and the lower lap of the conveyor belt.

The work tables in this embodiment extend laterally in parallel relation from one or both sides of the delivery table and comprise each, in this instance, a top 126 supported at its outer side by an upper cross piece formed by two angle irons and supported by a front upright of two angle iron pieces 127 and a rear upright of two angle iron pieces 128. The inner side of each work table is supported by an upper cross piece formed by two angle iron pieces 129 and two parallel uprights 130 and 131 both formed of two angle iron pieces, the former being at the rear in line with the back upright 128 and the latter (131) being in rear of the front upright 127 on the outer side of the table. The cross piece 129 projects forwardly in front of the upright 131 and has two short parallel angle iron pieces 132 depending from its forward end and serving as a means of connecting the work table with the delivery table. In this instance, an eye plate 133 is bolted at 134 to two irons 132 and receives a bolt 135 the head of which is passed through the slot 125 and engages the inner faces of the angle iron pieces 124. The uprights 130 and 131 are connected near their lower ends by a short connecting means in the form of two angle irons 136. Connecting means may be provided between the rear uprights 128 and 130 and in this instance embodies two pairs of angle iron pieces 137 and 138 which may also act as supports for a motor. The forward upright 127 may have a treadle supporting member 139 in the form of two angle iron pieces secured thereto at 140 and to a floor plate at 141. It will be noted that the inner end frame of each table is so formed that the floor is exposed for storage use directly beneath the forward portion of the inner end of the table and in order that the materials may be confined beneath such forward inner end of the work table and also beneath the upper lap of the conveyor on the floor a confining means is employed comprising two walls 142 and 143 secured in rigid relation at right angles to each other and held by a bolt 144 to the upright 131. In this way material from the upper lap of the conveyor may be dropped or deposited on the floor adjacent each work table and held for operation thereon by the operative at the table.

What I claim as my invention and desire to secure by Letters Patent is:

1. A work conveyor comprising transversely extending frames having recesses in opposite sides, a conveyor belt guided on said frames above and below said recesses, and a work support arranged between the laps of said belt at the lower sides of the recesses, the recesses permitting unobstructed access to the work support.

2. In a work conveyor, the combination with an endless conveyor, of a plurality of transverse frames supporting said conveyor and each comprising two horizontal portions arranged one above the other, both between the laps of the conveyor, and upright connecting means connecting the horizontal portions away from the ends of both, and work supporting means supported by the lower horizontal portions of the frames.

3. In a work conveyor, the combination with an endless conveyor, of a plurality of transversely extending frames supporting the conveyor and each comprising two horizontal portions arranged one above the other, both between the laps of the conveyor, and upright connecting means between the horizontal portions away from the ends of both, a work support supported on the lower horizontal portions of the frames, and a conveyor supporting table supported on the upper horizontal portions of the frames.

4. A work bench comprising an endless delivery belt, means including spaced transversely disposed frames for supporting said belt to travel so that one lap operates above and in spaced relation to the other, means providing a support for work between said laps, work tables adjustably secured to said supporting means and arranged to extend laterally from said belt, that side of each work table adjacent the endless delivery belt having a forwardly opening unobstructed recess, and means forming a continuation of the work support between the laps and extending into the adjacent recesses of the side frames of the tables, each of said transverse frames having an outwardly opening recess at the side thereof adjacent said tables whereby to provide for unobstructed access to said work supporting means at and between said transverse frames.

5. The combination with an endless delivery belt, of a plurality of transversely extending frames supporting said belt and each having a recess on one side between the two laps of the belt, a work support connecting the frames at the bottoms of the recesses and arranged between the laps of the belt, a plurality of work tables connected to said frames and extending laterally from the belt and each having its side frame adjacent the belt provided with a forwardly opening recess, and work containers secured in said frame recesses and forming continuations of the work support between the laps of the belt, said recesses in said frames permitting of unobstructed access to said work support at and between said frames.

6. The combination with an endless delivery belt, of a plurality of transversely extending frames supporting said belt, a pair of spaced members connecting said frames and vertically adjustable thereon, the space between said members forming a slot, tables extending laterally from the belt, and means connecting the tables to the said frames and operating in said slot for adjustment of the tables longitudinally of the belt.

7. Means for facilitating work on wearing apparel or similar fabrics including separate sets of work tables, a work bench operable to travel between said sets of tables immediately adjacent the inner ends of the tables to convey the fabrics to and beyond the tables, the tables of each set being spaced apart to provide working space for the respective operatives between them close to the travelling work bench so as to enable the operatives to conveniently reach and remove material from the work bench to work upon it at the respective table and upon completion of the work readily replace the material on the work bench for travel to another operative at another table for further handling thereof, a work support arranged adjacent the travelling bench accessible to all of the operatives stationed between the tables, and a container arranged at the inner end of each space between adjacent tables and being of a width less than the length of the tables and having an open side adjacent said work support to thereby enlarge the capacity of the work support, the containers each being swingingly mounted to permit the containers to be swung from between the tables onto the work support.

8. Means for facilitating work on wearing apparel or similar fabrics including a travelling conveyor, tables extending laterally from the conveyor and having their inner ends close to the conveyor and spaced apart to provide working space for the respective operatives between them and close to the travelling conveyor so as to enable the operatives to conveniently reach and remove material from the travelling conveyor to work upon it at the respective table and upon completion of the work readily replace the material on the conveyor for travel to another operative at another table for further handling thereof, a work support arranged adjacent the travelling conveyor and accessible to all of the operatives stationed between the tables, and a container swingingly mounted between adjacent tables at the inner ends thereof and being of a width less than the length of the tables and having an open side adjacent said work support to thereby enlarge the capacity of the work support.

9. Means for facilitating work on wearing apparel and similar fabrics including a travelling work conveyor, work tables extending laterally from the work conveyor and spaced apart to provide working space for the respective operatives between them, and a container swingingly mounted at the inner end of each working space between adjacent tables and being of a width less than the length of the tables and having an open side adjacent the conveyor.

10. Means for facilitating work on wearing apparel and similar fabrics including a travelling work conveyor, work tables extending laterally from the work conveyor and spaced apart to provide working space for the respective operatives between them, and a container movably mounted in each working space between adjacent tables and having an open side adjacent the conveyor and through which open side material may be discharged from respective containers.

11. Means for operating upon wearing apparel or similar fabrics including a travelling work conveyor, work tables extending laterally from the work conveyor and spaced apart a distance to provide spaces between them for operatives, a work support beneath the carrying surface of the travelling conveyor and accessible to each operative, and means secured between the tables adjacent said conveyor in each space between said tables to receive and hold material taken from the travelling conveyor and shiftable when not in use to a position over said work support without disconnecting same from the securing means, said material holding means having its material supporting surface substantially horizontal with the work support and in normal operating position constituting an enlargement of the capacity of the work support.

12. Means for operating upon wearing apparel or similar fabrics including a travelling work conveyor, work tables extending laterally from the work conveyor and spaced apart a distance to provide spaces between them for operatives, and means secured between the tables adjacent said conveyor in each space between said tables to receive and hold material taken from the travelling conveyor and shiftable when not in use to a position under the operating surface of the travelling work conveyor without disconnecting same from said securing means.

13. Means for operating upon wearing apparel or similar fabrics comprising a framework including a base, a work support fixedly mounted on the base, vertical supporting means extending above the work support, horizontal bars connected to said vertical supporting means, an endless belt mounted to travel on said framework, means mounted on said horizontal bars over which the upper lap of the endless belt travels and is prevented from sagging, said vertical supporting means being arranged substantially midway between the longitudinal edges of the work support and the said means over which the upper lap of the endless belt operates, and thereby providing a maximum space for the storage or support of work to be operated upon and also permitting ready access to the work on the support, and spaced work tables secured to said framework and extending laterally therefrom.

14. A work bench including an endless travelling delivery conveyor having an upper lap, means for supporting the conveyor, spaced work tables extending laterally from the conveyor affording substantially narrow spaces for the operatives between the tables to permit ready access to articles on the conveyor, a work support below said upper lap of the conveyor and a container secured between the tables and adjacent said supporting means at the inner end of the space between adjacent tables and being of a width less than the length of the tables, the supporting surface of the container being arranged in substantially the same horizontal plane as the work support to enlarge the latter and to permit ready shifting of work from and to the work support and container or from the container to the work support.

15. A work bench including an endless travelling conveyor for the conveyance of fabric materials and having a lap arranged above and in spaced relation to the other lap, spaced work tables extending laterally from the conveyor and having their tops disposed on a substantially horizontal plane with the upper lap of the conveyor, and a container arranged at the inner end of each space between adjacent tables and swingingly supported in position so that it may be swung to a position between the laps of the conveyor when not in use.

16. A work bench including an endless travelling conveyor for the conveyance of articles of various kinds, having a lap arranged above and in spaced relation to the other lap, means for supporting the conveyor including spaced transverse frames, each frame having a relatively wide and deep recess in one side thereof, work tables extending laterally from the conveyor at the recessed sides of said frames and spaced apart to afford ample space for an operative to have ready access to the articles on the conveyor, a work support arranged below the upper lap of the conveyor and disposed at the lower sides of the recesses of said frames, said recesses permitting unobstructed access to the work support at and between said frames, and means located adjacent the work support and in substantially horizontal alignment therewith to increase the capacity of the work support and extending into the space between adjacent tables for the convenience of an operative to push or pull work from the work support on to said means or from said means on to the work support and being of a width less than the length of the space between adjacent tables.

17. A work bench including an endless travelling conveyor for the conveyance of articles of various kinds, having a lap arranged above and in spaced relation to the other lap, work tables extending laterally from the conveyor and spaced apart to afford ample space for an operative to have ready access to the articles on the conveyor, a work support arranged between the laps of the conveyor and disposed adjacent the lower lap of the same, said support being open and unobstructed adjacent the inner ends of the adjacent tables to afford ready access thereto, a container arranged at the inner end of each space between the adjacent tables and being of a width less than the length of the tables and having an open side adjacent the open side of said work support to enlarge the capacity of the work support, and means whereby to swingingly mount the container so as to permit it to be swung into the space between the laps of the conveyor onto the work support when the container is not in use.

18. A work bench including an endless traveling conveyor for the conveyance of articles of various kinds, having a lap arranged above and in spaced relation to the other lap, a supporting means for the conveyor, a work table connected to said supporting means and extending laterally from the conveyor and having its working surface substantially in horizontal alignment with the upper lap of the conveyor, a work support arranged under the upper lap of the conveyor, and supplemental work support, means connected to the conveyor supporting means and extending laterally from the conveyor and also extending under the working surface of the table and disposed substantially in horizontal alignment with the work support to increase the supporting capacity of the latter.

19. Means for operating upon wearing apparel or similar fabrics comprising a framework including a base, a work support fixedly mounted on the base, vertical supporting means extending above the work support, horizontal members connected to the said vertical supporting means at the upper ends thereof, a conveyor mounted to travel in said framework, means supported by the said horizontal members to support a portion of said conveyor, said vertical supporting means being arranged substantially midway between the longitudinal edges of the work support and substantially midway between the ends of said horizontal members, and work tables secured to and extending laterally from said framework.

20. Means for operating upon wearing apparel or similar fabrics comprising a framework including a base, a work support fixedly mounted on the base, vertical supporting means extending above the work support, horizontal members connected to the said vertical supporting means at the upper ends thereof, an endless belt mounted to travel in said framework, means to support the upper lap of the belt in said framework so as to prevent sagging thereof, said vertical supporting means including an upright portion disposed substantially midway between the longitudinal edges of the work support and substantially midway between the ends of said horizontal members, and work tables secured to and extending laterally from said framework on opposite sides of the latter and having their tops disposed in a substantially horizontal plane with the upper lap of the endless belt.

21. Means for operating upon wearing apparel or similar fabrics comprising a framework including a base, a work support fixedly mounted on the base, supporting means extending above the work support, horizontal members connected to the said supporting means, an endless belt mounted to travel in said framework, means supported by the said horizontal members to support the upper lap of the belt in said framework so as to prevent sagging thereof, said supporting means including an upright portion arranged substantially midway between the longitudinal edges of the work support and substantially midway between the ends of said horizontal members, and work tables adjustably secured to and extending laterally from said framework on opposite sides of the latter, the said location of said upright portions of the supporting means providing for unobstructed access to the work support at the sides of the latter between the tables irrespective of adjustments of the latter.

22. Means for facilitating work on wearing apparel, comprising a framework including transversely extending frames, each frame having a recess in a vertical side thereof, a conveyor guided over said frames, and a work support mounted in said frames at the lower portions of said recesses, said recesses in said frames permitting of unobstructed access to the work support at and between said frames substantially throughout the length of the work support.

23. In a work conveyor, the combination with an endless conveyor, of a framework for the support of the conveyor including a plurality of transverse frames each comprising two horizontal portions arranged one above the other and the upper horizontal portions being disposed immediately below the upper lap of the conveyor, upright connecting means connecting the horizontal portions away from the ends of both, spaced tables connected to the framework along one side thereof, and work supporting means supported by the lower horizontal portions of the frames, the transverse frames being spaced and arranged with relation to the framework so as to provide for unobstructed access to the work support from a position between the tables.

24. Means for operating upon wearing apparel or similar articles comprising a framework including a base, a work support fixedly mounted upon the base, supporting means extending above the work support, horizontal members connected to said supporting means, an endless belt mounted to travel in said framework, means supported by said horizontal members to support the upper lap of the belt in said framework so as to prevent sagging thereof, said vertical supporting means including upright portions arranged substantially midway between the longitudinal edges of the work support and substantially midway between the ends of the horizontal members, and work tables adjustably secured to and extending laterally from said framework, the said location of said vertical portions of the supporting means providing for unobstructed access to the work support all along the sides of the latter between the tables irrespective of adjustments of the latter.

25. A work conveyor comprising transversely extending frames, each having recesses in opposite sides, a conveyor belt including upper and lower laps and having the upper lap thereof guided on the upper portion of said frames above said recesses, and a work support arranged below the upper lap of the conveyor belt and disposed at the lower sides of the recesses, said recesses permitting unobstructed access to the work support.

26. A work bench comprising transversely extending frames having recesses in opposite sides, means for supporting said frames above the floor, transversely disposed lower rollers journaled in said supporting means above the floor, end frames at the ends of the work bench, transversely disposed upper rollers journaled on said end frames, a conveyor belt guided on said transverse frames and operating over said upper and lower rollers above and below the recesses of the transverse frames, and a work support arranged between the laps of said belt at the lower sides of the recesses, the recesses permitting unobstructed access to the work support.

27. A work bench comprising transversely extending frames each having a recess in one side thereof, a conveyor belt including upper and lower laps and having the upper lap thereof guided on the upper portion of said frames above the recesses of said frames, and a work support arranged below the upper lap of the belt and disposed at the lower sides of the recesses of said frames, said recesses permitting unobstructed access to the work support at and between said frames substantially throughout the length of the work bench.

28. Means for operating upon wearing apparel or the like including a work bench comprising a top and transversely arranged frames, the latter each having a recess in one side thereof, a work support arranged below the top of the work bench and disposed at the lower sides of the recesses of the transverse frames, said recesses permitting unobstructed access to the work support at and between said frames substantially throughout the length of the work bench, and a container movably secured adjacent the work bench for cooperation with the work support to increase the work holding capacity of the work support and movable when not in use to a position between the top of the work bench and the work support without disconnecting the container from said securing means.

WALTER A. ADAMS.

CERTIFICATE OF CORRECTION.

Patent No. 1,904,708.                                                                 April 18, 1933.

WALTER A. ADAMS.

It is hereby certified that error appears in the printed specification of the above numbered patent requiring correction as follows: Page 9, line 2, claim 18, after "support" strike out the comma; and that the said Letters Patent should be read with this correction therein that the same may conform to the record of the case in the Patent Office.

Signed and sealed this 23rd day of May, A. D. 1933.

M. J. Moore.

(Seal)                                                          Acting Commissioner of Patents.